Patented June 5, 1934

1,961,622

UNITED STATES PATENT OFFICE 1,961,622

METHOD FOR PREPARING FLUORINATED METHANE

Howard S. Nutting and Peter S. Petrie, Midland, Mich., assignors to The Dow Chemical Company, Midland, Mich., a corporation of Michigan No Drawing. Application May 13, 1931, Serial No. 537,212

8 Claims. (Cl. 260—162)

The present invention relates to a method for preparing fluoro-chloro-methanes by reacting carbon tetrachloride with a halogen-fluoride, the term "halogen", throughout this specification and in the claims, being used to represent any member of the halogen family other than fluorine.

We have found that the chlorine in carbon tetrachloride can be partially or completely substituted by fluorine to form monofluoro-trichloro-methane, difluoro-dichloro-methane, trifluoro-monochloro-methane, carbon tetrafluoride or mixtures thereof. To obtain such products, carbon tetrachloride is reacted with a halogen-fluoride which may be used as such, or the components thereof, i. e. fluorine and iodine, bromine or chlorine, may be added separately to the reaction mixture. By varying the operating conditions, the product and yield of the same may be controlled.

Our invention, then, consists of the new method for producing fluoro-chloro-methanes and carbon tetrafluoride, hereinafter fully described and particularly pointed out in the claims, the following description setting forth several of the various ways of applying the principle of our invention.

In practicing our invention, the reactants may be contacted in any suitable way. For instance, carbon tetrachloride may be added progressively to the aforementioned halogen-fluoride, or, fluorine may be passed into or over a solution of another halogen in carbon tetrachloride, or, again, fluorine and another halogen may both be passed into or over carbon tetrachloride. The aforestated ingredients may be reacted under reflux in such a way as to permit a desired product to escape from the system, other products being practically completely returned thereto. Also, the reaction may be carried out under any desired pressure, whether reduced, atmospheric, or increased pressure, the pressure necessary in a given instance being determined generally as that required to permit the production of a particular product. For instance, if the reaction were run at atmospheric pressure and room temperature, very little, if any, carbon tetrafluoride would be formed, for the intermediate compounds difluoro-dichloro-methane of boiling point —29.5° C. at 760 millimeters pressure, and trifluoro-monochloro-methane of boiling point —82° C. at 760 millimeters pressure would vaporize from the reaction mixture as rapidly as formed. For maximum production of carbon tetrafluoride, it is evident that the reaction must be run under such a pressure as to retain the above mentioned intermediate products within the reaction mixture until the fluorination process is completed. In analogous manner suitable variations of the method may be used to produce other fluoro-chloro-methanes. It is self-evident that the temperature at which the reaction involved is run may also be varied widely, but it has been found that a reaction temperature of between —50° and +50° C. is preferable in operating our process.

The crude reaction product, which may comprise a mixture of fluorinated compounds, and which may be gaseous at ordinary temperature and pressure, may be scrubbed with an alkaline solution to remove excess halogen, and then separated into single components thereof by any suitable procedure, such as by fractional condensation from the gaseous state or by fractional distillation from the liquid state.

The principal reactions probably involved in the formation of the aforementioned products from the action of bromine trifluoride on carbon tetrachloride may be represented by the following equations:—

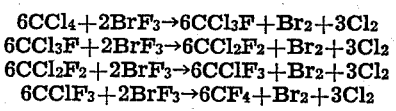

Analogous reactions occur when carbon tetrachloride is treated with other halogen-fluorides.

Several of the various modes of applying the principle of our invention are described in the following examples, it being understood, however, that such examples are purely illustrative and are not to be construed as a limitation on the invention.

Example 1

A small quantity (about 5 grams) of bromine trifluoride was placed in a copper flask immersed in ice water and fitted with a dropping funnel which contained 50 grams of carbon tetrachloride. The carbon tetrachloride was allowed to drop slowly into the fluoride. A reaction occurred immediately, gas being formed as a product. The gaseous product was collected over water in the usual manner, washed with a caustic alkali solution, then passed into a trap, which was cooled with carbon dioxide and acetone, where part of it (8 grams) was condensed to a liquid having a boiling point below —15° C. The liquid product so collected consisted principally of difluoro-dichloro-methane, boiling point —29.5° C. Of the gaseous product from which the 8 grams of liquid mentioned above was condensed, a volume of 1350 cc. at atmospheric pressure and room temperature passed through the aforementioned cooling trap without being liquefied. These gases consisted of a mixture of trifluoro-monochloro-methane and carbon tetrafluoride. There was 32 grams of unreacted carbon tetrachloride recovered.

*Example 2*

Into a copper flask, fitted with a reflux condenser having suitable apparatus for the collection of gases connected with it, and cooled to −10° C. in a calcium chloride-ice bath, were placed 100 grams of carbon tetrachloride and 75 grams of bromine. During a period of 2 hours, fluorine was bubbled into the reaction mixture, gases evolved during such treatment being condensed in a trap cooled with an acetone-carbon dioxide mixture. By such treatment, 41 grams of liquid was collected in the aforementioned trap, of which, 14 grams remained non-volatile at room temperature and 16 grams of said material remained volatile after being washed with a dilute caustic alkali solution. The last named material consisted largely of difluoro-dichloro-methane intermixed with small quantities of trifluoro-monochloro-methane and monofluoro-trichloro-methane. In the reaction flask remained 143 grams of material consisting almost entirely of unreacted bromine and carbon tetrachloride.

The process may be controlled so as to produce desired fluorinated methanes, such control involving merely the use of careful technique in handling materials, such as using the correct rates, order, and relative proportions for intermixing the various ingredients and reacting said ingredients at the temperature and pressure necessary in order to produce a relatively large proportion of any desired fluoro-chloro-methane or carbon tetrafluoride.

We have found that iodine penta fluoride may be used to fluorinate carbon tetrachloride in a manner similar to that described for the use of bromine trifluoride for that purpose. Chlorine mono-fluoride, or a chlorine and fluorine mixture, may also be used as the fluorinating agent in the aforementioned process, the last named fluorinating agent, however, being extremely reactive and very volatile, so that its use in the aforementioned process is comparatively difficult.

Our invention, then, involves reacting carbon tetrachloride with bromine trifluoride, iodine penta-fluoride, or chlorine mono-fluoride, preformed as such or introduced into carbon tetrachloride separately as the respective free halogen and fluorine, preferably at atmospheric or super-atmospheric pressure and preferably at a temperature of between −50° and +50° C.

Other modes of applying the principle of our invention may be employed instead of those described in the examples, change being made with regard to the relative quantities of the various ingredients employed, provided the ingredients stated by any of the following claims or the equivalents of such stated ingredients be employed.

We therefore particularly point out and distinctly claim as our invention:—

1. A process of making a fluorinated methane which comprises reacting a compound of fluorine and another halogen with carbon tetrachloride and separating the reaction products.

2. In a process for making a fluorinated methane, the step which consists in reacting a compound of fluorine and another halogen with carbon tetrachloride.

3. In a process for making a fluorinated methane, the step which consists in reacting bromine-trifluoride with carbon tetrachloride.

4. In a process for making a fluorinated methane, the step which consists in reacting bromine-trifluoride with carbon tetrachloride under pressure at a temperature between −50° and +50° C.

5. In a process for making a fluorinated methane, the step which consists in reacting bromine-trifluoride with carbon tetrachloride at atmospheric pressure and at room temperature.

6. In a process for making a fluorinated methane, the step which consists in reacting bromine-trifluoride with carbon tetrachloride under pressure and at a temperature of between −50° and +50° C., and at the same time refluxing the intermediate products and permitting the desired product to escape from the reaction mixture.

7. In a process for making a fluorinated methane, the step which consists in passing elemental fluorine into contact with a solution of carbon tetrachloride and a halogen selected from the class consisting of bromine and iodine.

8. In a process for making fluorinated methane the step which consists in passing elemental fluorine into contact with a solution of carbon tetrachloride and bromine.

HOWARD S. NUTTING.
PETER S. PETRIE.